United States Patent
Bak et al.

(10) Patent No.: US 8,392,872 B2
(45) Date of Patent: Mar. 5, 2013

(54) PSEUDO TRANSLATION WITHIN INTEGRATED DEVELOPMENT ENVIRONMENT

(75) Inventors: Nathan V. Bak, Portland, OR (US); Dale M. Schultz, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 1438 days.

(21) Appl. No.: 11/282,793

(22) Filed: Nov. 19, 2005

(65) Prior Publication Data

US 2007/0169013 A1    Jul. 19, 2007

(51) Int. Cl.
G06F 9/44    (2006.01)
G06F 9/45    (2006.01)

(52) U.S. Cl. .................. 717/100; 717/124; 717/136

(58) Field of Classification Search .................. 717/124, 717/100, 136
See application file for complete search history.

(56) References Cited

U.S. PATENT DOCUMENTS

| | | | |
|---|---|---|---|
| 5,664,206 A * | 9/1997 | Murow et al. ...................... | 704/8 |
| 5,678,039 A | 10/1997 | Hinks et al. | |
| 6,275,790 B1 | 8/2001 | Yamamoto et al. | |
| 6,425,123 B1 | 7/2002 | Rojas et al. | |
| 6,453,462 B1 * | 9/2002 | Meade et al. .................. | 717/124 |
| 6,507,812 B1 | 1/2003 | Meade et al. | |
| 6,647,544 B1 | 11/2003 | Ryman et al. | |
| 6,658,627 B1 * | 12/2003 | Gallup et al. .................. | 715/236 |
| 7,103,875 B1 * | 9/2006 | Kaneko et al. ................ | 717/125 |
| 7,409,333 B2 * | 8/2008 | Wilkinson et al. ................ | 704/2 |
| 7,526,753 B2 * | 4/2009 | Spencer et al. ............... | 717/109 |
| 2002/0156881 A1 * | 10/2002 | Klopp Lemon et al. ...... | 709/224 |
| 2004/0122652 A1 * | 6/2004 | Andrews et al. .................. | 704/2 |
| 2004/0167768 A1 * | 8/2004 | Travieso et al. .................. | 704/2 |
| 2004/0267803 A1 | 12/2004 | Zhou et al. | |
| 2005/0050526 A1 * | 3/2005 | Dahne-Steuber et al. ..... | 717/136 |
| 2005/0065772 A1 | 3/2005 | Atkin et al. | |
| 2005/0108682 A1 | 5/2005 | Piehler et al. | |
| 2005/0137844 A1 | 6/2005 | Voruganti | |
| 2005/0188308 A1 | 8/2005 | Schultz | |
| 2006/0178866 A1 * | 8/2006 | Chiu et al. ....................... | 704/2 |

OTHER PUBLICATIONS

Wassmer ("Dr. Tom's Independent Software Reviews Presents RC-WinTrans X8", web article dated 2004, url: http://www.softreviews.org/rcwintrans/rcwintransX8.html, retrieved on: Apr. 27, 2010).*
K. Sorensen et al., "On the conversion of program specifications into pseudo code using Jackson structured programming," J'l of Computing & Info. Tech'y, CIT 9, year 2001, v 1.
Ian Henderson, "The art of multilingual software testing," Software Business Magazine, Nov./Dec. 2003.
Sarosh Syed, "Benefits and issues of binary localization," White Paper, www.sdl.com, copyright 2001-2005.
Glossary Entry for Pseudo-Translation and Pseudo-Localization, www.gala-global.org, copyright 2004.
Language Studio, various Internet web pages, http://ls.atia.com, copyright 2002.

(Continued)

Primary Examiner — Li B Zhen
Assistant Examiner — Hang Pan
(74) Attorney, Agent, or Firm — Steven Bennett

(57) ABSTRACT

A computer program is pseudo translated within an integrated development environment (IDE). Pseudo translation is performed, within an IDE, on one or more first resource files for the computer program, to generate corresponding one or more second resource files, without modifying one or more source code files for the computer program. The computer program is debugged and/or run, within the IDE, using the second resource files, such that the second resource files remain hidden from a user of the IDE, and without changing the user interface language of the computerized system.

10 Claims, 5 Drawing Sheets

OTHER PUBLICATIONS

RC-WINTRANS X8 information, web page accessed from web site www.schaudin.com and printed on Jun. 9, 2010.

Screenshots taken from Internet web site www.schaudin.com regarding RC-WinTrans, copyright 2003-2008.

* cited by examiner

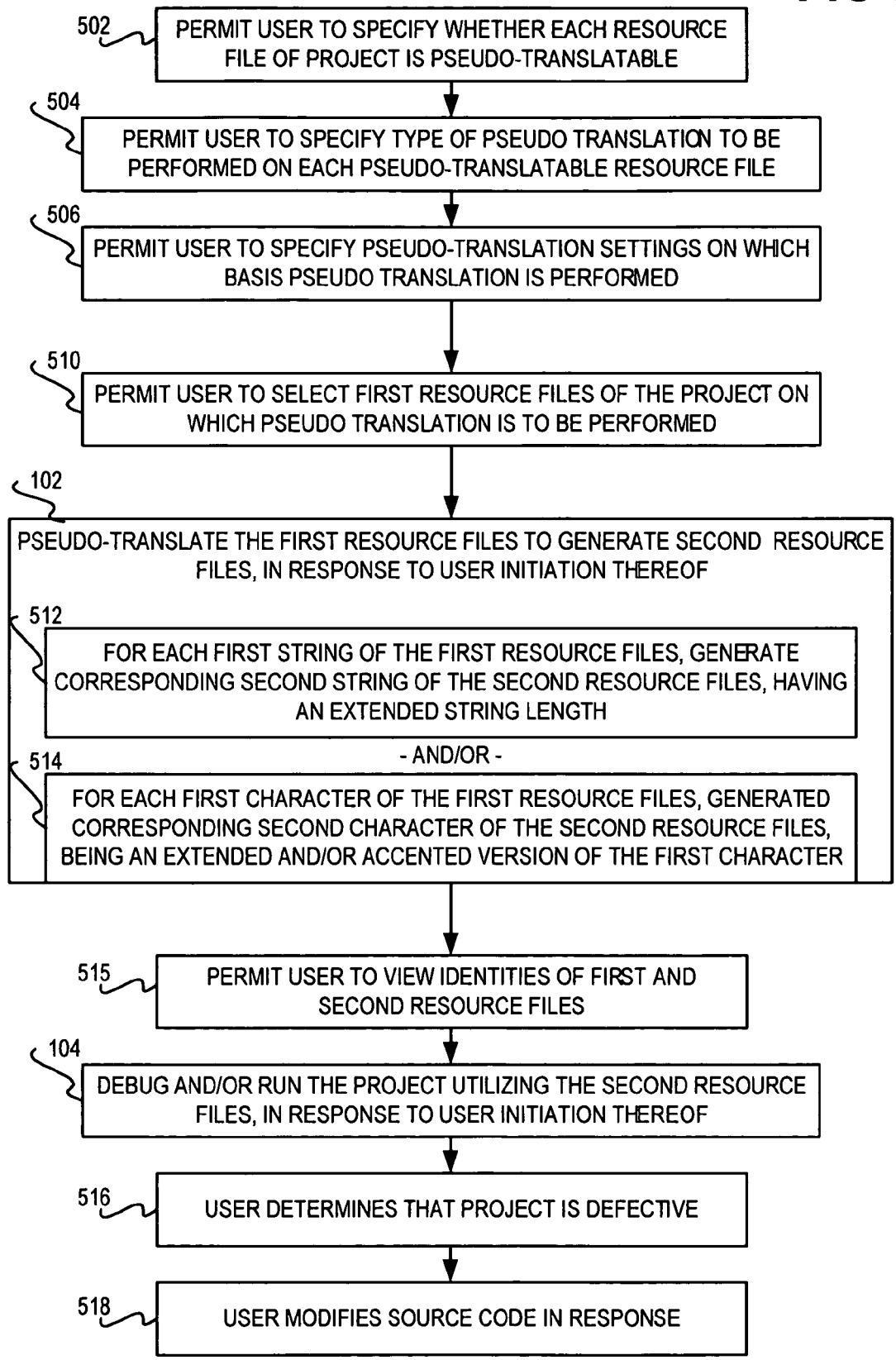

PSEUDO TRANSLATION WITHIN INTEGRATED DEVELOPMENT ENVIRONMENT

FIELD OF THE INVENTION

The present invention relates generally to pseudo translation, and more particularly to performing such pseudo translation within an integrated development environment.

BACKGROUND OF THE INVENTION

Computer programs are typically developed in relation to a given language of the users that will be using the programs. For example, a computer program may be developed in which all of the prompts to the user are provided in the English language, specifically American English. Computer programs are also frequently translated to different languages. A computer program in which all of the prompts to the user are provided in American English may be translated so that the prompts instead appear in Spanish, for instance.

To assist in translating a computer program written in relation to one given language to a number of other languages, all of the prompts, or strings, that the computer program may provide or display to the user may be stored in resource bundles encompassing one or more separate files, which are referred to herein as resource files. Each resource file may contain a list of strings in a given language, such as American English. The prompts are arranged so that when the computer program is to display a given string to the user, it looks up which string to display within one of the resource files.

Therefore, translating the computer program written in relation to one language to another language involves translating at least some of the strings within the resource files. Once a program has been developed in relation to its original language, for instance, a professional translator may be hired to translate at least some of the strings within the resource files to a different language. Desirably, the source code of the computer program itself does not have to be modified, or translated. It is noted that source code includes programming statements and instructions that are written by a programmer. Source code is what a programmer writes, but it is not directly executable by the computer. It is instead converted into machine language, or object code, by compilers, assemblers or interpreters. It is also noted that a given resource file or set of resource files may have prompts or other strings in a variety of different languages, and not necessarily just in one language.

In some situations, translation of a computer program from one language to another language may cause the computer program to fail, or otherwise operate incorrectly. This may be because the computer program may not have been written to appropriately handle accented characters. Such accented characters include those like á, è, ü, ş, and so on, which are common to many European languages, for instance, but which are not commonly found in the English language.

Computer program failure may also result from the computer program having not been written to appropriately handle characters that are represented by more than one byte of data. For example, English language characters typically are encoded by using a single byte of data having eight bits, because there are sufficiently few English characters to permit all of the characters to each be uniquely represented by eight bits. However, with Asian languages in particular, there may be a greater number of characters, such that more than eight bits are needed to uniquely represent each character. In such instances, typically each character is represented by two or more bytes, for a total of sixteen or more bits.

Therefore, historically, once a computer program was translated from one language to another language, the computer program was tested to make sure that it did not fail, or otherwise operate incorrectly, after translation. If the computer program was found to not operate correctly, then the source code was modified and converted into machine language or object code so that the computer program could be tested again. This iterative process continued until the program worked as intended.

However, this process of testing a computer program after translation in another language is problematic for at least three reasons, only one of which has been solved within the prior art. First, for a large and complex computer program, it may take several months, if not longer, to translate all the resource files of the computer program into the desired language. As a result, any errors within the source code of the computer program that causes the program to operate incorrectly after translation are not able to be found until the translation is completed.

To solve this problem, pseudo translation has been successfully used. Pseudo translation is also commonly referred to as mock translation, pseudo localization, and fake language translation. Pseudo translation is the process of converting the prompts or other strings of a computer program in a translation-like process. Pseudo translation can be performed by computer, without involving a translator, and thus can be used to test whether a computer program is likely to operate correctly once the computer program in actuality has been eventually translated into another language. That is, the computer program can be immediately tested in relation to its pseudo translation, such that successful testing can indicate that the computer program will likely operate properly when it is eventually and actually later translated to a real language.

In pseudo translation, the strings of a computer program are converted into words that do not truly represent any language, but which mimic common languages to which a computer program may be translated. Stated another way, pseudo translation is the process of converting strings that mimic another language without the benefit of actual translation into that language. Typically but not necessarily, however, the converted strings still are recognizable by someone knowledgeable in the original language.

For example, individual characters of strings may be converted to their accented equivalents. The English word "same," may be pseudo translated to "ş ámè." This latter pseudo-translated word is still recognizable within English, but the letters s, a, and e have been converted to accented versions of these letters. While the word "ş ámè" is not an actual word in any language, its accented letters can assist in testing the computer program to determine whether the computer program will operate correctly in the presence of the accented letters. That is, the computer program is tested against the pseudo-translated strings thereof, and once the computer program has been modified to operate correctly in the presence of the accented letters of such pseudo-translated strings (if such modification is even necessary), it can be concluded that the computer program will likely operate correctly upon the actual translation to another language.

Pseudo translation can also involve, depending on the target language or languages being mimicked, replacing single-byte characters with multiple-byte characters. As has been discussed above, for instance, Asian languages in particular commonly have their letters each represented by two or more bytes, whereas the English language usually has its letters each represented by one byte. Therefore, pseudo translation may involve replacing each single-byte character with a multiple-byte character. The resulting strings may still be recognizable in the original language, such as English. The computer program can then be tested to ensure that it works properly in relation to strings that have characters each represented by multiple bytes, without having to actually translate the program to another language.

Even with pseudo translation, however, a second problem has emerged in testing computer programs to ensure that they will operate correctly upon being translated to another language. This problem is that the testing-source code revision-source code compilation iterative process can be unduly burdensome and time-consuming to the developer of the computer program. For example, the developer may be able to test a computer program within an integrated development environment (IDE) in which the computer program is being developed in implicit or explicit relation to the language of the user interface of the computerized system on which the IDE is being run. An IDE is a set of computer programs run from a single user interface and that permit the editing, compilation, and debugging of a computer program being developed from a common menu.

However, IDE's do not allow for testing of computer programs in relation to different languages. Therefore, once a computer program has been developed within an IDE and is believed to be working correctly, it is actually "built," in that an installation executable file for the computer program is generated, which when executed or run on a computing device installs the computer program for running or execution. During the building process, pseudo translated resource files, in lieu of the original resource files, may be used, so that the computer program upon installation and execution uses the pseudo translated resource files instead of the original resource files.

The computer program is installed and executed on a computing device and is executed using a user interface language that the pseudo translation is mimicking. If upon building, installation, and execution of a computer program, the computer program does not operate correctly, then this entire process has to be restarted. That is, the source code of the computer program has to be revised to correct for the errors that occur in relation to the pseudo translated resource files, the computer program has to be rebuilt, reinstalled, re-executed, and so on. This iterative process can be burdensome and time-consuming, because testing cannot be accomplished entirely within an IDE.

Furthermore, this process of testing computer programs in relation to different languages reveals a third problem in such prior art testing of computer programs in relation to different languages. This third problem is that debugging a pseudo-translated computer program, to determine which line of which source code file is causing the computer program to operate incorrectly in relation to a pseudo-translated resource file, can be difficult and itself time-consuming and burdensome to accomplish. Modern IDE's typically have robust debugging tools that allow a developer to step through source code line by line, so that the developer can easily locate exactly where the cause of a given problem lies.

However, these debugging tools cannot easily be used to test computer programs in relation to pseudo-translated resource files in the aforementioned prior art testing process. That is, because a computer program may not be able to be tested in relation to pseudo-translated resource files until it has been built, installed, and executed, an IDE's debugging tools cannot be used, because they can only be used within the confines of the IDE itself. The prior art testing of a computer program in relation to pseudo-translated resource files involves testing upon actual execution of the program on a computing device, after having switched the user interface language of the computerized system on which the IDE is being run to one that the pseudo translation is mimicking. Thus, after being built and being installed, the computer program can only be tested in real-time, and not on a source code line-by-source code line basis using a debugging tool. Therefore, once a problem has been identified, the developer has to manually locate the source of the problem within the source code of the computer program.

For these and other reasons, there is a need for the present invention.

SUMMARY OF THE INVENTION

The present invention relates to pseudo translation of a computer program within an integrated development environment (IDE). A method of one embodiment of the invention is performed with an IDE running on a computerized system. The method performs pseudo translation on one or more first resource files for a computer program, to generate corresponding one or more second resource files, without modifying one or more source code files for the computer program. The method debugs and/or runs the computer program using the second resource files, such that the second resource files remain hidden from a user of the IDE, and without changing the user interface language of the computerized system.

In one embodiment, performing the pseudo translation may include performing at least one of the following. First, for each of at least one of the strings of the first resource files, a corresponding second string of the second resource files is generated. Each second string has an extended string length as compared to its corresponding first string, in bytes. Second, for each first character of at least one of the characters of the first resource files, the first character is replaced with a second character in the second resource files. Each second character can be an accented and/or an extended version of the first character.

Debugging and/or running the computer program using the second resource files can include debugging and/or running the computer program using the second resource files corresponding to a user interface language different than the user interface language of the computerized system on which the IDE is being run. In one embodiment, in response to the user determining that the computer program is defective upon debugging and/or running the computer program using the second resource files, the user modifies the source code files to correct the defects of the computer program, without having to view the second resource files.

The user may select the first resource files for the computer program on which pseudo translation is to be performed, such that there are one or more other resource files on which pseudo translation is not to be performed. Likewise, the user may select individual strings or blocks of strings which will not be pseudo translated, while the remainder of the resource file contents will be pseudo translated. The user may select all the first resource files on which pseudo translation, such that the first resource files include all pseudo translatable resource files for the computer program. That is, the user may select just some of the pseudo translatable resource files as to which pseudo translation is to be performed, or the user may select all the pseudo translatable resource files as to which pseudo translation is to be performed.

A number of resource files may encompass the first resource files. The method may thus permit the user to specify whether each resource file is pseudo translatable or not. The method may further permit the user to specify a type of pseudo translation to be performed on each resource file that is pseudo translatable.

In one embodiment, the method displays identities of the first resource files to the user, as well as identities of the second resource files to the user. These identities may be filenames of the resource files, for instance. The user may be permitted to specify pseudo translation settings on which basis the first resource files are pseudo translated to generate the second resource files.

These pseudo translation settings may include at least one of the following. First, the user may specify whether only marked strings with the first resource file are to be translated or are not to be pseudo translated. Second, the user may specify whether strings within lines of the first resource files denoted by same line markers are to be pseudo translated or are not to be pseudo translated, where same line markers may be markers that are on the same lines as the strings in question. Third, the user may specify whether strings within lines of the first resource files denoted by next line markers are to be pseudo translated or are not to be pseudo translated, where next line markers may be markers that are on the lines immediately preceding the lines of the strings in question. Fourth, the user may specify whether strings between or within a beginning block marker and an ending block marker are to be pseudo translated or are not to be pseudo translated.

A computerized system of an embodiment of the invention includes an IDE within which a user is able to develop one or more source code files for a computer program for which there are also one or more resource files. The resource files specify human-readable text to be used by the source code files. The computerized system also includes a pseudo-translation component of the IDE to pseudo translate one or more first resource files for the computer program to generate corresponding one or more second resource files. Each second resource file represents a pseudo-translated version of the human-readable text of a corresponding first resource file.

The computerized system may further include a debugging component of the IDE, and/or a running component of the IDE. The debugging component permits debugging of the computer program by the user in relation to the second resource files, without changing the user interface language of the computerized system on which the IDE is being run, and such that the second resource files remain hidden from the user. The running component permits running of the computer program using the second resource files, without changing the user interface language of the computerized system on which the IDE is being run, and such that the second resource files remain hidden during running, or execution.

An article of manufacture of an embodiment of the invention includes a tangible computer-readable medium, and means in the medium. The computer-readable medium may be a recordable data storage medium, or another type of computer-readable medium. The means is for pseudo translating, within an IDE, one or more first resource files for a computer program, to generate corresponding one or more second resource files. Each second resource file represents a pseudo-translated version of the human-readable text of a corresponding first resource file. The second resource files remain hidden from the user, and a user interface language of a computerized system within which the IDE is running remains unchanged, during debugging and running, or execution, of the computer program.

Embodiments of the invention provide for advantages over the prior art. Unlike the prior art, pseudo-translated computer programs can be directly run and debugged within an IDE. As such, a user does not have to build, install, and run a pseudo-translated version of a computer program on a computing device having an operating system in which the user interface language has been set to a language that the pseudo translation is mimicking. Rather, the IDE simulates the switching of the user interface language to a language that the pseudo translation of the computer program is mimicking, without actually having to change the user interface language of the computerized system within which the IDE is running.

Therefore, testing of a pseudo-translated computer program is less burdensome and less time-consuming by employing embodiments of the invention. Unlike as in the prior art, a user employing an embodiment of the invention can debug the source code of a computer program on a source code line-by-source code line basis in relation to the pseudo translation of the computer program without importing pseudo-translated files from an outside source and modifying the computer program. Furthermore, the resource files that represent the pseudo translation of the computer program remain hidden from the user. Therefore, the user will not confuse the original resource files with the pseudo-translated resource files, for instance.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 5 is a flowchart of a method more detailed than, but consistent with, the method of FIG. 1, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
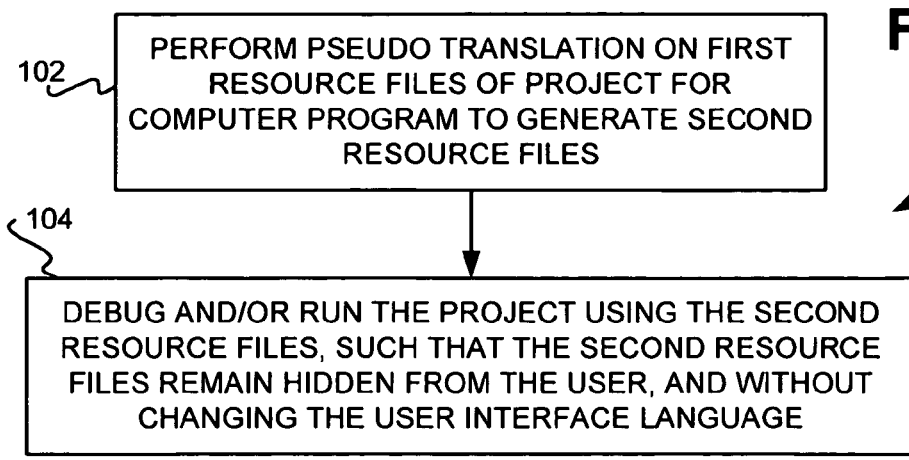
FIG. 1 is a flowchart of a method, according to an embodiment of the invention, and is suggested for printing on the first page of the patent.

FIG. 1 shows a method 100, according to an embodiment of the invention. The method 100 is performed within an integrated development environment (IDE). As has been described, an IDE is a set of computer programs that are run from a single user interface, and that permit the editing, compilation, and debugging of a computer program being developed from a common menu. Thus, an IDE allows a user to develop a computer program within a centralized environment. The IDE is run on a computerized system, such as a computing device like a desktop or a laptop computer.

First, pseudo translation is performed on one or more first resource files of a project corresponding to a computer program being developed, to generate corresponding one or more second resource files (102). A project is a set of files that correspond to a given computer program being developed. A project thus includes source code files, which are files that include the programming statements and instructions that are written by the user, such as a programmer. That is, source code is what a programmer writes, but is not directly executable by a computing device. Rather, the source code is converted into machine language or object code, by compilers, assemblers, and/or interpreters, which may or may not be part of the IDE.

A project may also include resource files. The resource files include a listing of the prompts, or strings, that the computer program that corresponds to the project may provide or display to the user during execution or running of the computer program. The resource files are formatted, so that when the computer program is to display a given string to the user, it is able to look up which string to display within one of the resource files.

The first resource files of the project may include a subset of all the resource files of the project or all the resource files of the project. Therefore, pseudo translation of the first resource files to corresponding second resource files involves pseudo translating at least some of the strings of the first resource files to pseudo-translated versions thereof within the second resource files. The second resource files thus mimic different languages to which the computer program may ultimately be translated, such as European languages like Spanish, German, and French, Asian languages like Japanese and Chinese, as well as other languages. The pseudo translation of the first resource files to generate the second resource files is accomplished without modifying the source code files of the project, and is also accomplished without modifying the first resource files themselves.

Next, the project is debugged and/or run, using the second resource files (104). That is, the user of the IDE is able to debug and/or run the project using the second resource files, to examine how the computer program that corresponds to the project is likely to run when the computer program is actually translated. The debugging or running of the project using the second resource files is accomplished without exposing the second resource files to the user. That is, the second resource files remain hidden from the user. As a result, the pseudo translation process is hidden from the user; the user debugs or runs the project within the IDE no different than if the first resource files were used, even though the second resource files are actually being employed. The debugging or running process using the pseudo translation, in other words, is seamless in that the user is not exposed to the second resource files.

The utilization of the second resource files during debugging or running of the project within the IDE means that when prompts or other strings are to be displayed to the user, such strings are acquired from the second resource files, instead of from the first resource files. Furthermore, the strings from the second resource files are displayed to the user as if the computerized system on which the IDE is running has its user interface language set to a language that the pseudo translation represented by the second resource files. For example, the computerized system and the IDE may be set to use American English, while the language that the pseudo translation represented by the second resource files is mimicking is Spanish, Japanese, or even a language that does not actually exist. Therefore, debugging or running of the project within the IDE, utilizing the second resource files, simulates a computerized system in which the user interface language is this other language, instead of American English, for instance.

As a result, the user does not have to switch the user interface language of the computerized system on which the IDE is running in order to debug or run the project within the IDE and using the second resource files. The method 100 itself simulates switching the user interface to the language that the pseudo translation of the second resource files is mimicking. This is advantageous, because it also contributes to the seamlessness of the debugging or running process using the pseudo translation, since the user does not have to manually or otherwise switch the user interface language.

Technical Background of Pseudo Translation

As has been described, pseudo translation is the process of converting the prompts or other strings of a computer program in a translation-like process. Pseudo translation can be performed by computer, without involving a translator, and thus can be used to test whether a computer program is likely to operate correctly once the computer program in actuality has been eventually translated into another language. That is, the computer program can be immediately tested in relation to its pseudo translation, such that successful testing can indicate that the computer program will likely operate properly when it is eventually and actually later translated to a real language that the pseudo translation mimics. For instance, pseudo translation may be performed as particularly described in U.S. Pat. Nos. 6,507,812, 6,453,462, and 6,425,123, among other types of pseudo translation.

Figure 2A:
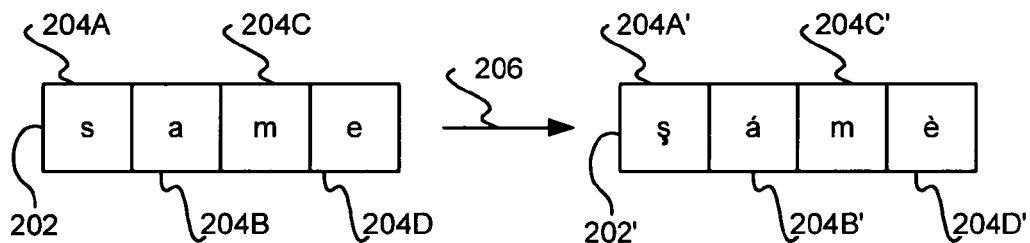
FIGS. 2A and 2B are diagrams depicting examples of two types of pseudo translation, in conjunction with which embodiments of the invention may be employed.

FIG. 2A shows an example of a first type of pseudo translation that may be performed by embodiments of the invention, in which individual characters of strings are converted to their accented or extended equivalents. The English word 202 "same" has four letters 204A "s," 204B "a," 204C "m," and 204D "e," collectively referred to as the letters 204. The word 202 is pseudo translated to the word 202', as indicated by the arrow 206. The pseudo-translated word 202' "ş ámè" corresponds to the word 202. The word 202' has the letters 204A' "ş," 204B' "á," 204C' "m," and 204D' "è," collectively referred to as the letters 204'. The word 202' is thus still recognizable within English, but the letters 204A, 204B, and 204D have been converted to accented or extended versions thereof, as the letters 204A', 204B', and 204D'.

While the word 202' "ş ámè" is not an actual word in any language, its accented or extended letters can assist in testing the computer program to determine whether the computer program will operate correctly in the presence of the accented letters. That is, the computer program is tested against the pseudo-translated strings thereof. Once the computer program has been modified to operate correctly in the presence of the accented letters of such pseudo-translated strings (if such modification is even necessary), it can be concluded that the computer program will likely operate correctly upon the actual translation to another language.

Thus, the type of pseudo translation depicted in FIG. 2A is that the strings of a computer program are converted into words that do not truly represent any language, but which mimic common languages to which a computer program may be translated. Stated another way, pseudo translation can include converting strings that mimic another language without the benefit of actual translation into that language. Typically but not necessarily, however, the converted strings still are recognizable in the original language.

Figure 2B:
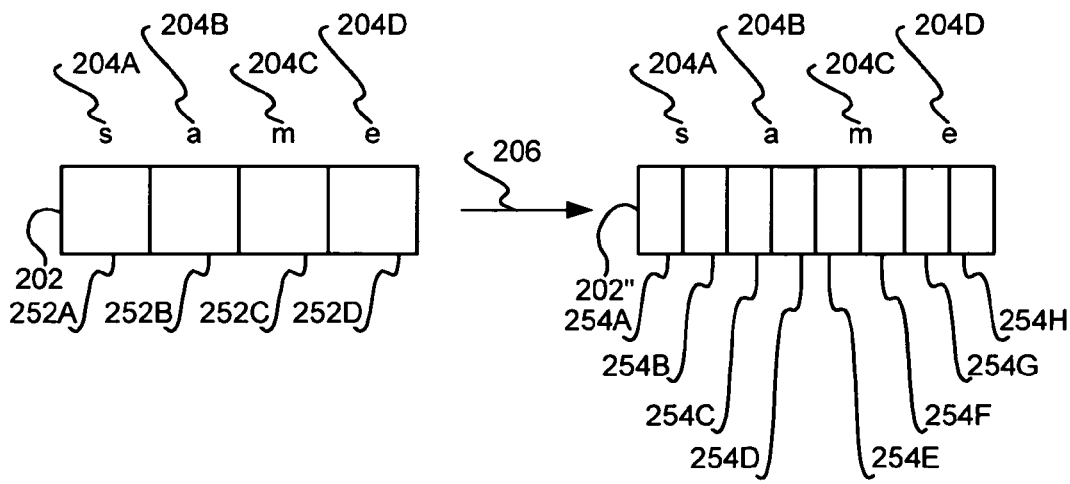

FIG. 2B shows an example of a second type of pseudo translation that may be performed by embodiments of the invention, in addition to and/or in lieu of the first type depicted in FIG. 2A. In the second type of pseudo translation depicted in FIG. 2B, depending on the target language or languages being mimicked, single-byte characters are replaced with double-byte characters. The English word 202 "same," having the four letters 204, is represented by four bytes 252A, 252B, 252C, and 252D, collectively referred to as the bytes 252, where each of the letters 204 is represented by a single one of the bytes 252 in the word 202. The word 202 is pseudo translated to the word 202", as indicated by the arrow 256. The word 202" still has the same four letters 204.

However, the word 202" is represented by eight bytes 254A, 254B, 254C, 254D, 254E, 254F, 254G, and 254H, collectively referred to as the bytes 254. Each of the letters 204 is represented by two of the bytes 254 in the word 202". For example, the letter 204A "s" is represented by the two bytes 254A and 254B in the pseudo-translated word 202", while it is represented by the single byte 252A in the original word 202. The type of pseudo translation depicted in FIG. 2B is useful to verify whether a computer program properly runs in relation to ultimate translations thereof to target languages in which letters are represented by two or more bytes each instead of by one byte each.

As has been described, for instance, Asian languages in particular commonly have their letters each represented by two bytes, whereas the English language usually has its letters each represented by one byte. Therefore, pseudo translation can involve replacing each single-byte character with a double-byte, or more generally a multiple-byte, character. The resulting strings may still be recognizable in the original language, such as English, as in the particular example depicted in FIG. 2B, or they may be represented in a font of the target language, such as Chinese, Japanese, or another Asian language. The computer program can then be tested to ensure that it works properly in relation to strings that have characters each represented by two bytes, without having to actually translate the program to another language.

It is noted that embodiments of the invention may be performed in relation to pseudo translation other than the example types described in relation to FIGS. 2A and 2B. That is, embodiments of the invention are not limited to performing the pseudo translation described in relation to FIGS. 2A and 2B, and can employ any type of pseudo translation.

Integrated Development Environment (IDE) and Computerized System

Figure 3:
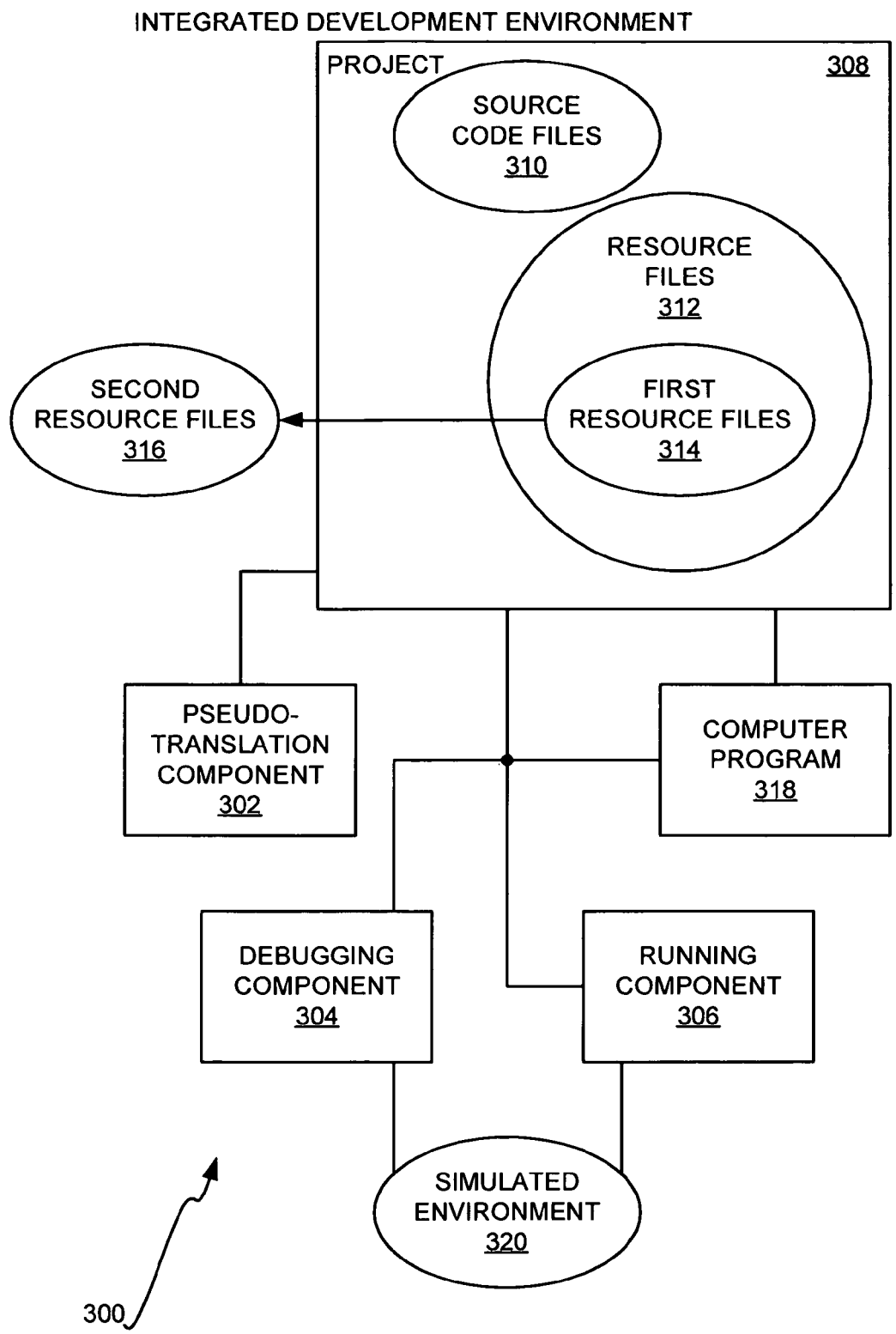
FIG. 3 is a diagram of an integrated development environment (IDE), according to an embodiment of the invention.

FIG. 3 shows an integrated development environment (IDE) 300, according to an embodiment of the invention. The IDE 300 includes a pseudo-translation component 302, a debugging component 304, and a running component 306. Each of the components 302, 304, and 306 may be implemented in software, hardware, or a combination of software and hardware. The IDE 300 may itself be run on a computerized system, and thus may be run in relation to an operating system of such a computerized system. The computerized system may be a computing device, for instance, like a desktop or a laptop computer. The IDE 300 may have other components, in addition to and/or in lieu of the components 302, 304, and 306 depicted in FIG. 3.

As has been described, the IDE 300 enables a user to develop a computer program 318, by specifically constructing a project 308 within the IDE 300 to which the computer program 318 corresponds. The project 308 is a set of files, including source code files 310 and resource files 312. Thus, the IDE 300 allows the user to develop the source code files 310, by creating, editing, and testing the source code files 310, where such testing in particular is accomplished in relation to the resource files 312. The resource files 312 include first resource files 314, which are diagrammatically depicted in FIG. 3 as being a subset of the resource files 312. However, the first resource files 314 may in another embodiment include all of the resource files 312, such that the set of files 314 is equal to the set of the files 312, and is not a subset of the set of files 312.

The pseudo-translation component 302 pseudo translates the first resource files 314 into, and to generate, the second resource files 316. Thus, each of the second resource files 316 represented a pseudo-translated version of the human-readable text of a corresponding one of the first resource files 314. The second resource files 316 in one embodiment of the invention remain hidden from the user of the IDE 300. Therefore, the second resource files 316 are depicted in FIG. 3 as not being part of the resource files 312 of the project 308 that the user may be responsible for creating or developing. In another embodiment, the second resource files 316 may be selectively viewed by the user. For instance, the user may specifically request that the IDE 300 reveal the second resource files 316 to the user.

The debugging component 304 permits the user to debug the project 308—i.e., the computer program 318 corresponding to the project 308—in relation to the second resource files 316. Similarly, the running component 306 permits the user to run or execute the project 308—i.e., the computer program 318 corresponding to the project 308—in relation to the second resource files 316. The difference between debugging and running in this respect is that debugging involves executing the computer program 318 on a source code line-by-source code line basis, so that the user is able to easily discern which lines of the source code files 310 are responsible for viewed behavior or functionality of the computer program 318. By comparison, running the computer program 318 involves executing the computer program 318 in real-time or in near-real-time, where the user may not be able to view which source code lines of the source code files 310 are responsible for various viewed behavior or functionality of the computer program 318.

Debugging and running of the project 308—i.e., the computer program 318 corresponding to the project 308—is accomplished in relation to a simulated user interface language environment 320. That is, debugging and running is accomplished in relation to a simulated computerized system, having a user interface language different than the user interface language of the computerized system in relation to which the IDE 300 is itself running. For example, the IDE 300 itself may be using the American English language; that is, the user interface language of the computerized system in relation to which the IDE 300 is running may be American English. The second resource files 316 may represent a pseudo translation of the first resource files 314 that mimics translation of the first resource files 314 into another language. Therefore, the debugging and running of the project 308, using the second resource files 316, is accomplished in relation to the user interface language environment 320 that uses this other language.

The user thus does not have to change the user interface language of the computerized system in relation to which the IDE 300 is running, since running and debugging of the project 308, using the second resource files 316, is accomplished in relation to the simulated user language environment 320. Further, during such running and debugging of the project 308, the second resource files 316 remain hidden from the user. That is, the user is able to simply specify the first resource files 314, and does not have to be concerned with the pseudo-translated versions of the first resource files 314 as encompassed by the second resource files 316.

It is noted that the invention can take the form of an entirely hardware embodiment, an entirely software embodiment or an embodiment containing both hardware and software elements. In one embodiment, for instance, the invention is implemented in software, which includes but is not limited to firmware, resident software, microcode, and so on.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disc. Current examples of optical discs include a compact disc-read only memory (CD-ROM), a compact disc-read/write (CD-RW) and a digital versatile disc (DVD).

Figure 4:
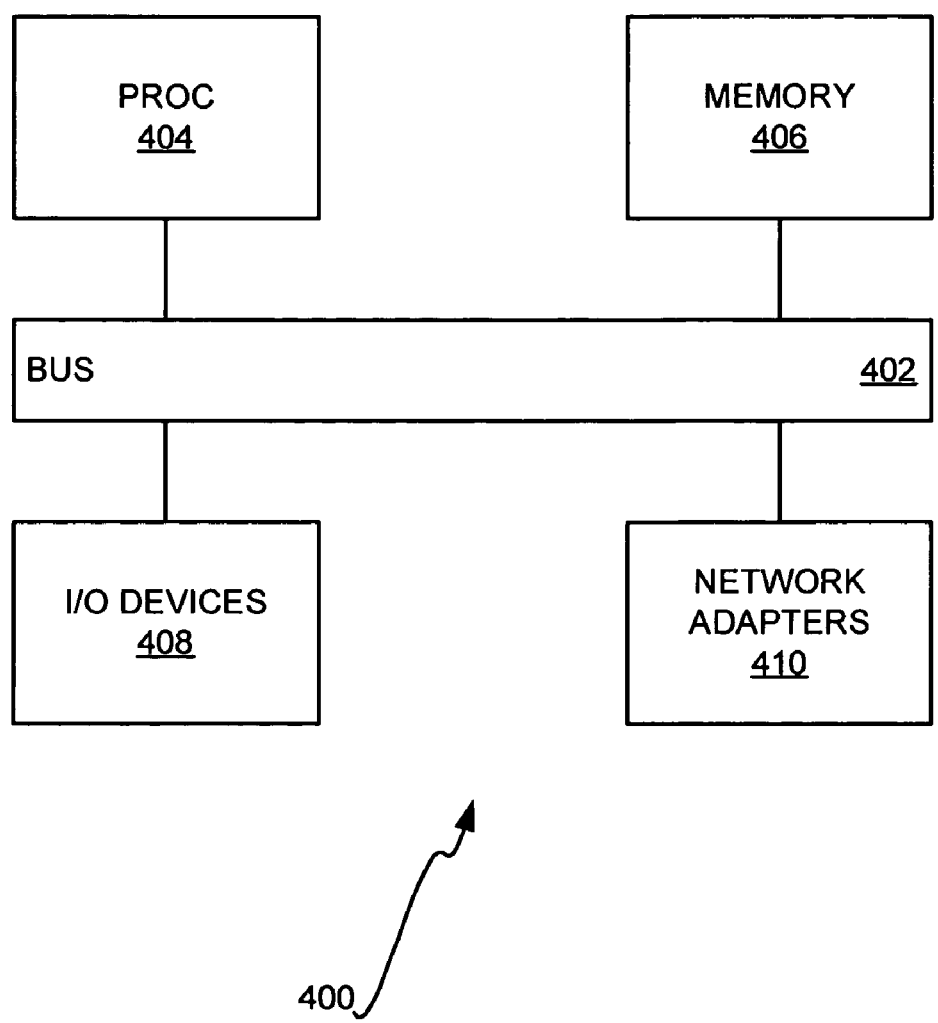
FIG. 4 is a diagram of an exemplary computerized system, in conjunction with which embodiments of the invention may be practiced.

FIG. 4 shows an exemplary computerized system 400, in relation to which the IDE 300 is capable of being run, according to an embodiment of the invention. The computerized system 400 is a data processing system suitable for storing and/or executing program code, and includes at least one processor 404 coupled directly or indirectly to memory elements 406 through a system bus 402. The memory elements 406 may include local memory employed during actual execution of the program code, bulk storage, and cache memories, the latter which provide temporary storage of at least some program code in order to reduce the number of times code must be retrieved from bulk storage during execution.

The computerized system 400 further may include input/output (I/O) devices 408, which include but are not limited to keyboards, displays, pointing devices, and so on. Such I/O devices 408 can be coupled to the system 400 either directly or through intervening I/O controllers. Network adapters 410 may also be coupled to the system 400 to enable the system 400 to become coupled to other systems, or to remote printers, storage devices, and so on, through intervening private or public networks. Modems, cable modem and Ethernet cards are just a few examples of currently available types of the network adapters 410.

Exemplary Detailed Method and Conclusion

FIG. 5 shows a method 500, according to an embodiment of the invention. The method 500 is more detailed than but consistent with the method 100 of FIG. 1 that has been described. The method 500 may be performed by or within the integrated development environment (IDE) 300 of FIG. 3. For instance, the pseudo-translation component 302, the debugging component 304, and the running component 306 may each perform various parts of the method 500 in one embodiment of the invention. As such, the method 500 is described in particular relation to the IDE 300 of FIG. 3 and its constituent components.

The pseudo-translation component 302 permits the user to specify whether each of the resource files 312 is pseudo translatable or not (502). For example, some of the resource files 312 may include strings that are not to be pseudo translated, such that the user is able to specify that the strings contained within such resource files are not to be pseudo translated, by specifying the files themselves as not being pseudo translatable. In one embodiment, permitting the user to specify whether the resource files 312 are individually pseudo translatable is accomplished by using a dialog box. For example, a user may right-click on a given resource file within a displayed list of the resource files 312, as can be appreciated by those of ordinary skill within the art, and then select within a resultingly displayed menu that the properties of that resource file be displayed. In response, a dialog box may be displayed to the user, within which the user may indicate that the resource file is pseudo translatable or is not pseudo translatable.

The pseudo-translation component 302 also permits the user to specify the type of pseudo translation to be performed for each of the resource files 312 that is pseudo translatable (504). For example, in one embodiment, the computer program 318 to which the project 308 corresponds may ultimately be translated to a wide audience speaking many different languages, such as 27 different languages, including European and Asian languages. In another embodiment, the computer program 318 may be ultimately translated to a narrower audience speaking different languages that are fewer in number, such as just 9 different languages, and potentially including just European languages.

Where the computer program 318 is to be ultimately translated to a wide audience speaking both European and Asian languages, specifying a corresponding type of pseudo translation to be performed may result in both of the types of pseudo translation described in relation to FIGS. 2A and 2B being accomplished. That is, letters of words may be replaced with accented or extended versions thereof, and each letter of each word may be represented by two or more bytes instead of by one byte. By comparison, where the computer program 318 is to be ultimately translated to a narrower audience speaking just European languages, specifying a corresponding type of pseudo translation to be performed may result in just the type of pseudo translation described in relation to FIG. 2A being accomplished. That is, letters of words may be replaced with accented or extended versions thereof, but each letter of each word remains being represented by one byte.

In one embodiment, permitting the user to specify the type of pseudo translation to be performed on the pseudo-translatable of the resource files 312 is individually accomplished for each of the pseudo-translatable resource files by using a dialog box. For example, a user may right-click on a given pseudo-translatable resource file within a displayed list of the resource files 312, as can be appreciated by those of ordinary skill within the art, and then select within a resultingly displayed menu that the properties of that resource file be displayed. In response, a dialog box may be displayed to the user, such as the same dialog box that is displayed in relation to part 502 of the method 500. In this dialog box, the user may indicate the type of pseudo translation that is to be performed.

The pseudo-translation component 302 also permits the user to specify pseudo-translation settings on which basis pseudo translation is performed (506). These pseudo-translation settings differ from the type of pseudo translation specified in part 504, in that they control pseudo translation for the entire project 308, and thus are not individually specifiable on a per-pseudo-translatable resource file basis, as to which the type of pseudo translation can be specified in part 504. In particular, the pseudo-translation settings dictate how pseudo-translatable resource files are to be parsed to determine which strings thereof are to actually be pseudo translated. That is, even if a resource file is pseudo translatable, not all the strings thereof may be pseudo translated during the pseudo-translation process. Rather, just the strings that satisfy the pseudo-translation settings specified by the user are pseudo translated.

Figure 6A:
FIGS. 6A, 6B, 6C, and 6D are diagrams of example and rudimentary resource files that illustrate the utilization of various pseudo-translation settings, according to varying embodiments of the invention.

Four different example pseudo-translation settings are described as exemplary of the type of pseudo-translation settings that can be employed by different embodiments of the invention. First, marked strings within resource files may be pseudo translated. Alternatively, marked strings within the resource may not be pseudo translated. FIG. 6A shows an example of such a marked string within a resource file 602, according to an embodiment of the invention. In FIG. 6A, the string "STRING 3" is marked with a marker 604 "<PTS>". As such, if the pseudo-translation setting that marked strings within resource files are to be pseudo translated is set, the string "STRING 3" will be pseudo translated during pseudo translation of the resource file 602. The other strings "STRING 1," "STRING 2," and STRING 4" may not be pseudo translated. Alternatively, if the pseudo translation setting that marked strings within resource files are not to be pseudo translated is set, all the strings except the string "STRING 3" may be pseudo translated during pseudo translation of the resource file 602. If neither such setting is set, then the marker 604 is ignored, and all the strings may be pseudo translated.

Figure 6B:
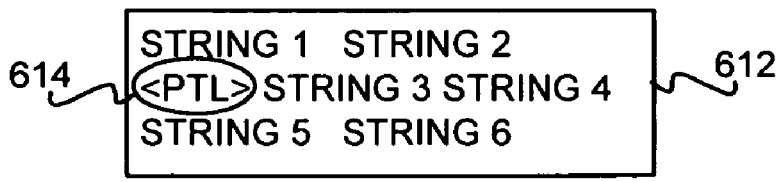

Second, strings within lines of resource files that are denoted by same-line markers may be pseudo translated, or alternatively, strings within lines that are denoted by same-line markers may not be pseudo translated. FIG. 6B shows an example of such a same-line marker within a resource file 612, according to an embodiment of the invention. In FIG. 6B, the line including the strings "STRING 3" and "STRING 4" is marked with a same-line marker 614 "<PTL>." The marker 614 is a same-line marker in that the marker 614 marks the line on which it appears. If the pseudo-translation setting that strings within lines denoted by same-line markers are to be pseudo translated is set, the strings "STRING 3" and "STRING 4" will be pseudo translated during pseudo translation of the resource file 612. The other strings "STRING 1," "STRING 2," "STRING 5," and "STRING 6," which appear on the other lines, may not be pseudo translated. Alternatively, if the pseudo-translation setting that strings within lines denoted by same-line markers are not to be pseudo translated is set, all the strings except for the strings "STRING 3" and "STRING 4" appearing on the marked line in question may be pseudo translated. If neither such setting is set, then the marker 614 is ignored, and all the strings on all the lines may be pseudo translated.

Figure 6C:
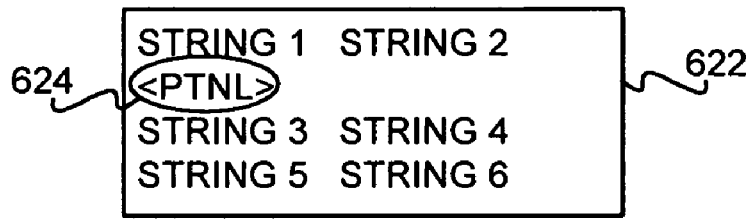

Third, strings within lines of resource files that are denoted by next-line markers may be pseudo translated, or alternatively, strings within lines that are denoted by next-line markers may not be pseudo translated. FIG. 6C shows an example of such a next-line marker within a resource file 622, according to an embodiment of the invention. In FIG. 6C, the line including the strings "STRING 3" and "STRING 4" is preceded by a line with a next-line marker 624 "<PTNL>." The marker 624 is a next-line marker in that the marker 624 marks the next immediately after the line on which the marker 624 appears. If the pseudo-translation setting that strings within lines denoted by next-line markers are to be pseudo-translated is set, the strings "STRING 3" and "STRING 4" will be pseudo translated during pseudo translation of the resource file 622. The other strings "STRING 1," "STRING 2," "STRING 5," and "STRING 6," which appear on the other lines, may not be pseudo translated. Alternatively, if the pseudo-translation setting that strings within lines denoted by next-line markers are not to be pseudo translated is set, all the strings except for the strings "STRING 3" and "STRING 4" appearing on the marked line in question may be pseudo translated. If neither such setting is set, then the marker 624 is ignored, and all the strings on all the lines may be pseudo translated.

Figure 6D:
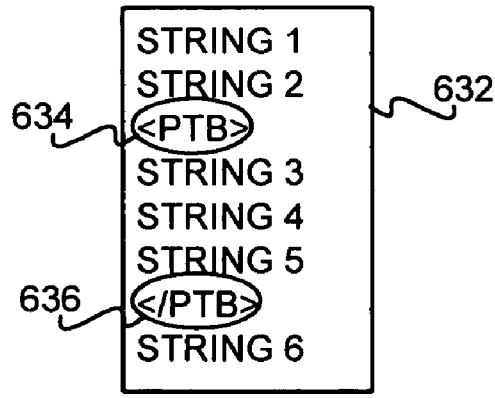

Fourth, strings within or between block markers of resource files may be pseudo translated, or alternatively, strings within or between block markers may not be pseudo translated. FIG. 6D shows an example of such block markers within a resource file 632, according to an embodiment of the invention. In FIG. 6D, the strings "STRING 3," STRING 4," and "STRING 5" are between the beginning block marker 634 "<PTB>" and the ending block marker 636 "<\PTB>." The marker 634 specifies the beginning of a block of strings, and the marker 636 specifies the end of a block of strings. There may be more than one pair of markers 634 and 636 within a resource file. If the pseudo-translation setting that strings between block markers are to be pseudo-translated is set, the strings "STRING 3," "STRING 4," and "STRING 5" will be pseudo translated during pseudo translation of the resource file 632. The other strings "STRING 1," "STRING 2," and "STRING 6," which are not between block markers, may not be pseudo translated. Alternatively, if the pseudo-translation setting that strings within block markers are not to be pseudo translated is set, all the strings except for the strings "STRING 3," "STRING 4," and "STRING 5" may be pseudo translated. If neither such setting is set, then the markers 634 and 636 are ignored, and all the strings may be pseudo translated.

In one embodiment, permitting the user to specify the pseudo-translation settings on which basis pseudo translation is performed is accomplished in relation to the project 308 as a whole by using a dialog box. For example, a user may select a preferences menu item within the IDE 300, as can be appreciated by those of ordinary skill within the art. In response, a dialog box may be displayed to the user. Within the dialog box, the user may be able to specify the pseudo-translation settings on which basis pseudo translation is performed, such as the four pseudo-translation settings that have been described in relation to FIGS. 6A, 6B, 6C, and 6D.

Referring back to FIG. 5, the pseudo-translation component 302 also permits the user to select the first resource files 314 of the project 308 that are to be pseudo translated (510). The user may select the first resource files 314 individually from the resource files 312. For example, the user may be displayed a list of all the resource files 312. The user may select the first resource files 314 from this list by clicking on them. More than one first resource file may be selected in one embodiment by holding down the control key while clicking on the desired resource files. The user may also select all the resource files 312 as the first resource files 314. For example, the user may simply select the project 308 itself, by clicking on its name. It is noted that even though certain or all of the resource files 312 may be selected in these different ways, the first resource files 314 includes just those of the selected files in question that have been specified as being pseudo translatable in part 502 of the method 500. Alternatively, the user may select each individual resource file and perform the method of the present invention one at a time.

Next, in response to user initiation thereof, pseudo translation of the first resource files 314 is accomplished to generate corresponding second resource files (102), as has been described. User initiation of pseudo translation may be accomplished, for example, by a user right-clicking on any of the resource files that have been selected in part 510, or by right-clicking on the project that has been selected in part 510. In response to such right-clicking, a menu may be displayed, in which the user is able to select a pseudo-translate menu item. Once the user has selected the pseudo-translate menu item, pseudo translation is performed. Alternatively, the user may select a pseudo-translate menu item from a menu bar displayed at the top of a window of the IDE 300 itself.

As has been described, pseudo translation can be accomplished in at least one of many different ways. Two different ways are described herein, but those of ordinary skill within the art can appreciate that other types and other ways of pseudo translation can also be accomplished. Therefore, for example, first, for each first string within the first resource files, a corresponding second string of the second resource files is generated that has an extended string length (512). That is, where each character or letter of each string of the first resource files is represented by one byte in the first resource files, each such corresponding character or letter is represented by two bytes in the second resource files, as has been described in relation to FIG. 2B. Furthermore, second, for example, for each first character of the first resource files, a corresponding second character of the second resource files is generated that is an extended and/or accented version of the first character (514), as has been described in relation to FIG. 2A. It is noted that pseudo translation is performed in relation to the pseudo-translation settings specified in part 506, such that certain strings and thus the characters of such strings may or may not be pseudo translated as dictated by these settings, as has been described.

The pseudo-translation component 302 may also permit the user to view the identities of the first and the second resource files in one embodiment of the invention (515). The identities of these files may be the filenames of the files. That is, even though the second resource files are typically hidden from the user, the user may in particular choose to view the identities of the second resource files. For example, the user may right-click on the project 308, as the name of which is displayed within the IDE 300, as can be appreciated by those of ordinary skill within the art, and then select within a resultingly displayed menu that the properties of the project 308 be displayed. In response, a dialog box may be displayed to the user, within which the user may be able to view the identities of both the first resource files and the second resource files.

Next, in response to user initiation, the debugging component 304 permits debugging of the computer program 318 representing the project 308, and/or the running component 306 permits running of the computer program 318 representing the project 308 (104), as has been described. Debugging and/or running of the computer program 318 is accomplished in relation to the second resource files 316, where the second resource files 316 remain hidden from the user. Furthermore, such debugging and/or running is accomplished in relation to a user interface language, such as within a simulated computerized system, that is different than the user interface language of the actual computerized system in which the IDE 300 is running, as has been described.

In one embodiment, then, the debugging and/or running process of the computer program 318 representing the project 308 may, for instance, culminate in the user determining that the project 308 is defective (516), insofar as the handling by the computer program 318 as to the pseudo-translated second resource files 316 is concerned. Therefore, the user is able to modify the source code files 310 in response (518), in order to correct these defects. Although not shown in FIG. 5, the user can then re-debug and/or rerun the computer program 318, in an iterative process, until the computer program 318 properly runs as to the pseudo-translated second resource files 316. Furthermore, the user can modify the first resource files, such as by adding new strings or marking strings which are not to be pseudo translated, and so on, run the pseudo translation again, and again run or debug the program. The user is thus able to verify that the computer program 318 properly runs in relation to the pseudo translation that has been performed, without ever exiting the IDE 300. That is, pseudo translation testing can itself be performed within the confines of the IDE 300, such that the computer program 318 as has been pseudo translated can be tested within the IDE 300.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, the methods of different embodiments of the invention that have been described can be implemented as computer programs that are stored on computer-readable media of articles of manufacture. Such computer-readable media may be tangible computer-readable media, like recordable data storage media. Therefore, it is manifestly intended that this invention be limited only by the claims and equivalents thereof.

We claim:

1. A method performed within an integrated development environment (IDE) running on a computerized system, comprising:

performing, within the IDE in which a computer program is being developed to operate such that user prompts of the computer program are presentable in a first human language and in a second human language, pseudo translation on one or more first resource files for the computer program, the one or more first resource files corresponding to the first human language, to generate corresponding one or more second resource files for the computer program, the one or more second resource files corresponding to the second human language, without modifying one or more source code files for the computer program, the one or more second resource files being pseudo-translated versions of the one or more first resource files;

after performing the pseudo translation on the one or more first resource files, and after generating the corresponding one or more second resource files, running the computer program within the IDE using the second resource files to test the computer program being developed to verify that the user prompts of the computer program are properly presented in the second human language, without changing a user interface language of the computerized system;

permitting within the IDE a user to specify whether each resource file of a plurality of resource files for the computer program including the first resource files is pseudo translatable; and permitting within the IDE the user to specify a type of pseudo translation to be performed on each resource file that is pseudo translatable, wherein the IDE is not part of a build process that uses a build application by which an installation executable file for the computer program is generated, which when executed or run on a computing device, installs the computer program for running or execution.

2. The method of claim 1, wherein the second resource files remain hidden from a user of the IDE during running of the computer program using the second resource files.

3. The method of claim 1, wherein performing the pseudo translation comprises at least one of:
   for each first string of at least one of one or more strings of the first resource files, generating a corresponding second string of the second resource files, the second string having an extended string length as compared to the first string; and,
   for each first character of at least one or more characters of the first resource files, replacing the first character with a second character of the second resource files, the second character being at least one of an accented and extended version of the first character.

4. The method of claim 1, wherein the running the computer program using the second resource files comprises running the computer program using the second resource files using a user interface language that is different than the user interface language of the computerized system.

5. The method of claim 1, further comprising, in response to a user determining that the computer program is defective as to the running of the computer program using the second resource files, the user modifying the source code files to correct defects of the computer program as to the running of the computer program using the second resource files without having to view the second resource files.

6. The method of claim 1, further comprising a user selecting the first resource files on which pseudo translation is to be performed, such that there are one or more other resource files for the computer program on which pseudo translation is not performed.

7. The method of claim 1, further comprising a user selecting all the first resource files on which pseudo translation is performed, the first resource files including all pseudo translatable resource files for the computer program.

8. The method of claim 1, further comprising displaying identities of the first resource files to a user, as well as identities of the second resource files to the user.

9. The method of claim 1, further comprising permitting a user to specify one or more pseudo-translation settings on which basis the first resource files are pseudo translated to generate the second resource files.

10. The method of claim 9, wherein the pseudo-translation settings comprise at least one of:
    whether only marked strings within the first resource files are to be pseudo translated or are not to be pseudo translated;
    whether strings within lines of the first resource files denoted by same line markers are to be pseudo translated or are not to be pseudo translated;
    whether strings within lines of the first resource files denoted by next line markers are to be pseudo translated or are not to be pseudo translated; and,
    whether strings within block markers of the first resource files are to be pseudo translated or are not to be pseudo translated.

* * * * *